(12) United States Patent  
Ramteke et al.

(10) Patent No.: US 9,009,719 B2  
(45) Date of Patent: Apr. 14, 2015

(54) COMPUTER WORKLOAD CAPACITY ESTIMATION USING PROXIMITY TABLES

(75) Inventors: Raman Venkatesh Ramteke, Bangalore (IN); Shiva Prakash Suragi Math, Bangalore (IN); Jerome Rolia, Kanata (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 685 days.

(21) Appl. No.: 12/970,824

(22) Filed: Dec. 16, 2010

(65) Prior Publication Data

US 2012/0159476 A1    Jun. 21, 2012

(51) Int. Cl.  
  *G06F 9/46* (2006.01)  
  *G06F 9/455* (2006.01)  
  *G06F 9/50* (2006.01)

(52) U.S. Cl.  
  CPC .......... *G06F 9/5033* (2013.01); *G06F 9/45558* (2013.01); *G06F 2009/4557* (2013.01); *G06F 2209/506* (2013.01)

(58) Field of Classification Search  
  None  
  See application file for complete search history.

(56) References Cited

U.S. PATENT DOCUMENTS

| 7,536,585 | B1 | 5/2009 | Keeton et al. |
| 7,827,361 | B1 | 11/2010 | Karlsson et al. |
| 2006/0287739 | A1 | 12/2006 | Bivens et al. |
| 2007/0055771 | A1 | 3/2007 | Tantawi et al. |
| 2008/0022282 | A1 | 1/2008 | Cherkasova et al. |
| 2008/0022284 | A1 | 1/2008 | Cherkasova et al. |
| 2009/0070771 | A1* | 3/2009 | Yuyitung et al. ............ 718/105 |

OTHER PUBLICATIONS

ITIL (IT Service Management) "Glossary of Terms and Definitions", ITIL V3 Glossary, v01, May 30, 2007.  
Martello, Silvano, and Paolo Toth, "Knapsack Problems: Algorithms and Computer Implementations", 1990, JOhn Wiley & Sons, Ltd, West Sussex, Chapter 1, pp. 1-11.

* cited by examiner

*Primary Examiner* — Meng An  
*Assistant Examiner* — Wissam Rashid  
(74) *Attorney, Agent, or Firm* — Clifton L. Anderson

(57) ABSTRACT

A proximity table is generated for a first of a group of hosts for one or more computer workloads. Workloads are assigned to the host by applying proximity rules to the proximity table. The generating of proximity tables and the assignment of workloads is iterated for other hosts until all workloads have been assigned. Once all workloads have been assigned, an opportunity estimate is calculated.

7 Claims, 9 Drawing Sheets

600

|   | 0 | 1 | 2 | 3 | 4 | 5 | 6 | 7 |
|---|---|---|---|---|---|---|---|---|
| 0 | 1 | 1 | 1 | 1 | 1 | 0 | 0 | 0 |
| 1 | 1 | 1 | 1 | 1 | 1 | 0 | 0 | 0 |
| 2 | 1 | 1 | 1 | 1 | 1 | 0 | 0 | 0 |
| 3 | 1 | 1 | 1 | 1 | 1 | 0 | 0 | 0 |
| 4 | 1 | 1 | 1 | 1 | 1 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

|   | 0 | 1 | 2 | 3 | 4 | 5 | 6 | 7 |
|---|---|---|---|---|---|---|---|---|
| 0 | 155 | 155 | 155 | 155 | 80 | 79 | 79 | 30 |
| 1 | 155 | 155 | 155 | 155 | 80 | 79 | 79 | 30 |
| 2 | 155 | 155 | 155 | 155 | 80 | 79 | 79 | 30 |
| 3 | 155 | 155 | 155 | 155 | 80 | 79 | 79 | 30 |
| 4 | 80 | 80 | 80 | 80 | 80 | 79 | 79 | 30 |
| 5 | 79 | 79 | 79 | 79 | 79 | 79 | 79 | 30 |
| 6 | 79 | 79 | 79 | 79 | 79 | 79 | 79 | 30 |
| 7 | 30 | 30 | 30 | 30 | 30 | 30 | 30 | 30 |

|     | VM4 | VM5 | VM6 | VM7 |
|-----|-----|-----|-----|-----|
| VM4 | 155 | 155 | 155 | 155 |
| VM5 | 155 | 155 | 155 | 155 |
| VM6 | 155 | 155 | 155 | 155 |
| VM7 | 155 | 155 | 155 | 155 |

FIG. 8

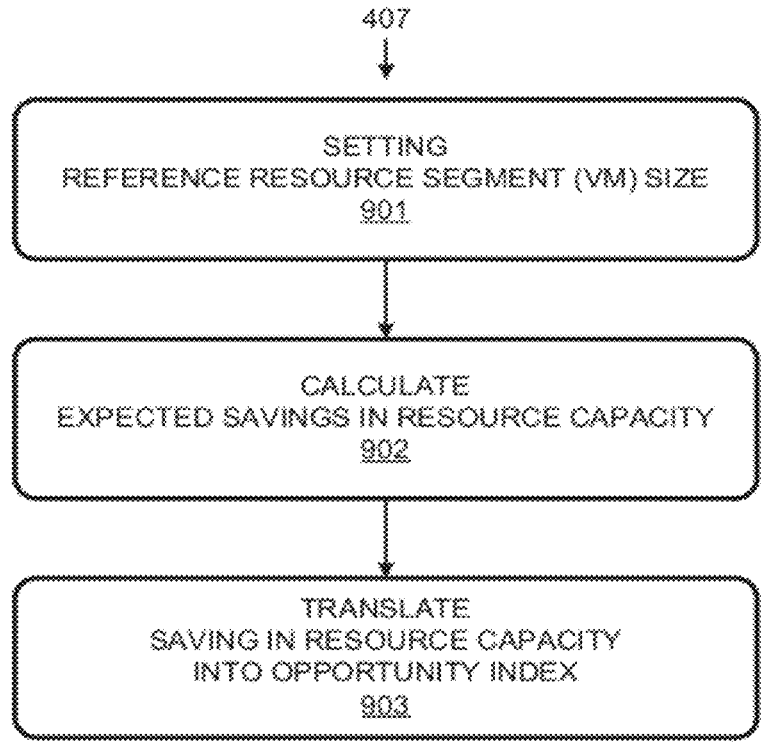

1200

| UTILIZATION TABLE | | | | | | |
|---|---|---|---|---|---|---|
| Data Point | V1 | V2 | V3 | V4 | V5 | V6 |
| D0 | 8 | 4 | 16 | 4 | 16 | 6 |
| D1 | 8 | 4 | 16 | 4 | 16 | 6 |
| D2 | 8 | 4 | 16 | 4 | 16 | 6 |
| D3 | 20 | 4 | 4 | 4 | 16 | 6 |
| D4 | 20 | 4 | 4 | 4 | 16 | 6 |
| D5 | 20 | 4 | 4 | 12 | 16 | 6 |
| D6 | 20 | 4 | 4 | 12 | 8 | 6 |
| D7 | 8 | 4 | 16 | 12 | 8 | 6 |
| D8 | 8 | 4 | 16 | 12 | 8 | 6 |

| PROXIMITY TABLE: HOST H21 | | | | | | |
|---|---|---|---|---|---|---|
| H21 | V1 | V2 | V3 | V4 | V5 | V6 |
| V1 | 9 | 9 | 9 | 5 | 0 | 0 |
| V2 | 9 | 9 | 9 | 5 | 0 | 0 |
| V3 | 9 | 9 | 9 | 5 | 0 | 0 |
| V4 | 5 | 5 | 5 | 0 | 0 | 0 |
| V5 | 0 | 0 | 0 | 0 | 0 | 0 |
| V6 | 0 | 0 | 0 | 0 | 0 | 0 |

| UTILIZATION TABLE | | | |
|---|---|---|---|
| Data Point | V4 | V5 | V6 |
| D0 | 4 | 16 | 6 |
| D1 | 4 | 16 | 6 |
| D2 | 4 | 16 | 6 |
| D3 | 4 | 16 | 6 |
| D4 | 4 | 16 | 6 |
| D5 | 14 | 16 | 6 |
| D6 | 14 | 8 | 6 |
| D7 | 14 | 8 | 6 |
| D8 | 14 | 8 | 6 |

| PROXIMITY TABLE: HOST H22 | | | |
|---|---|---|---|
| H22 | V4 | V5 | V6 |
| V4 | 9 | 9 | 8 |
| V5 | 9 | 9 | 8 |
| V6 | 8 | 8 | 8 |

FIG. 15

COMPUTER WORKLOAD CAPACITY ESTIMATION USING PROXIMITY TABLES

BACKGROUND

A large data center can include large numbers of workloads (e.g., virtual machines) executing on hardware hosts. In such a scenario, it is often of interest to know if and to what extent a group of hardware hosts can host additional workloads. The accuracy of estimates made simply considering unused hardware resources, e.g., CPU cycles, is often unsatisfactory. Capacity planning tools can be used to provide reliable estimates of the ability of a group of hardware hosts to handle more workloads, but can consume more resources than desirable in providing the estimate. What is needed is a less resource intensive approach for accurately estimating the capacity of a group of hosts to handle additional workloads.

BRIEF DESCRIPTION OF THE DRAWINGS

FIG. 6 is a proximity table for a single data point used in a first iteration of the process of FIG. 4.

FIG. 7 is a proximity table representing multiple data points used during a first iteration of the process of FIG. 4.

FIG. 8 is a proximity table used during a second iteration of the process of FIG. 4.

FIG. 9 is a flow chart for an estimation process segment of the process of FIG. 4.

FIG. 10 is a table for calculating an opportunity index as used in the process of FIG. 4.

FIG. 12 is a chronological, utilization data table including the is data used in generating the graphs of FIG. 11.

FIG. 13 is a proximity table generated using the data of the table of FIG. 12.

FIG. 14 is a chronological utilization data table including a subset of the data in the table of FIG. 14.

FIG. 15 is a proximity table generated using the data of the table of FIG. 14.

DETAILED DESCRIPTION

Figure 1:
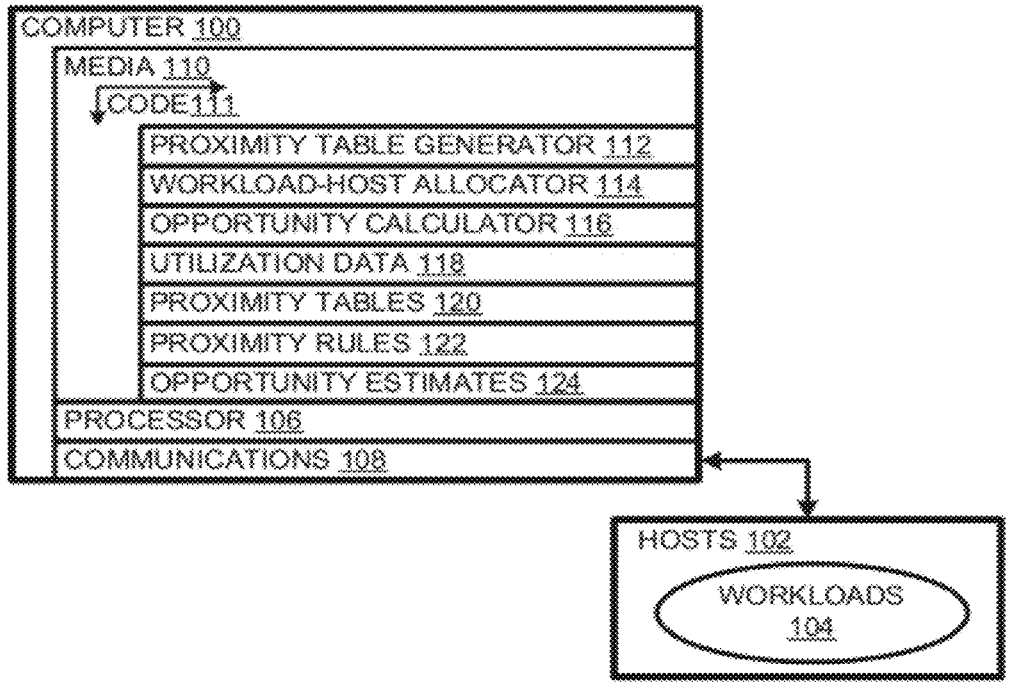
FIG. 1 is a schematic diagram of a system in accordance with an embodiment.

A computer 100, shown in FIG. 1, provides for efficient estimation of opportunities for hardware hosts 102 to handle workloads in addition to the workloads 104 already running on hosts 102. Computer 100 includes a processor 106, communications devices 108, and computer-readable storage media 110. Media 110 is encoded with code 111 defining the functionalities of a proximity table generator 112, a workload-host allocator 114, and an opportunity estimator 116. In addition, media 110 stores utilization data 118, proximity tables 120, proximity rules 122, and opportunity estimates 124.

Figure 2:
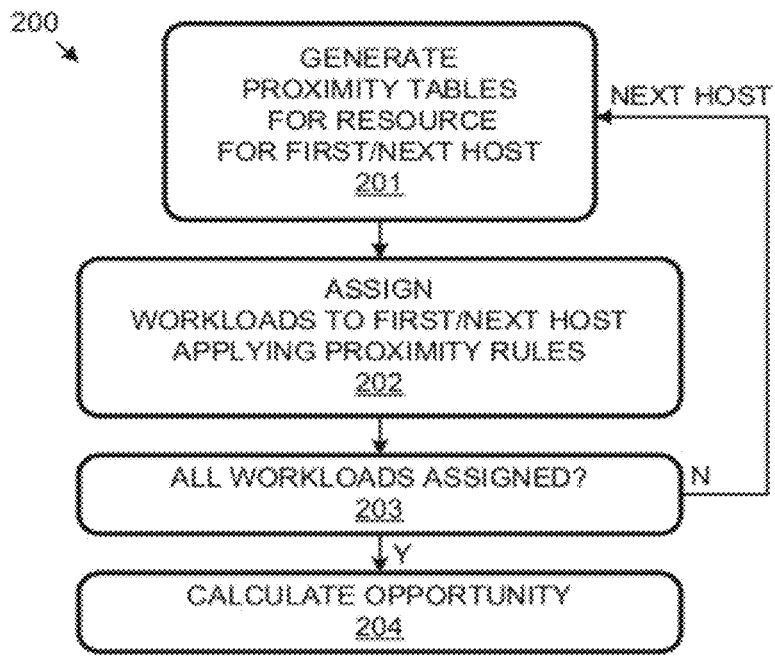
FIG. 2 is a flow chart of a process in accordance with an embodiment.

Computer 100 implements a process 200, flow charted in FIG. 2. At process segment 201, proximity table generator 112 generates proximity tables 120 based on utilization data 118. At process segment 202, workload-host allocator 114 allocates (i.e., plans an allocation that could potentially be implemented) on one or more of workloads 104 to a first of hosts 102 according to proximity rules 122. At process segment 203, workload-host allocator 114 determines whether or not any of workloads 104 remains to be allocated. If so, process 200 returns to process segment 201 for a next iteration of process segments 201-203 for a next host. Otherwise, process 200 proceeds to process segment 204, in which opportunity estimator 116 estimates an opportunity value for hosts 102 to handle additional workloads.

The allocations planned by workload-host allocator 114 during iterations of process segment 202 are intended to assist in generating an opportunity estimate and may or may not ever be implemented. Accordingly, much of the computational effort associated with optimizing allocations can be avoided. However, process 200 allows proximity rules to be taken into account, providing more reliable opportunity estimates than approaches based solely on used resources.

Proximity rules can take many forms. "Together" proximity rules specify which workloads are to be on the same host. "Apart" proximity rules specify workloads that are to be on different hosts. Variants of these together and apart rules specify conditions under which workloads are to be on the same or different hosts. For example, some rules specify thresholds which determine or at least affect whether workloads are to be together or apart. Some "absolute" rules can apply to all iterations of process 200, while others can be adjusted from iteration to iteration, or even during an iteration.

Figure 3:
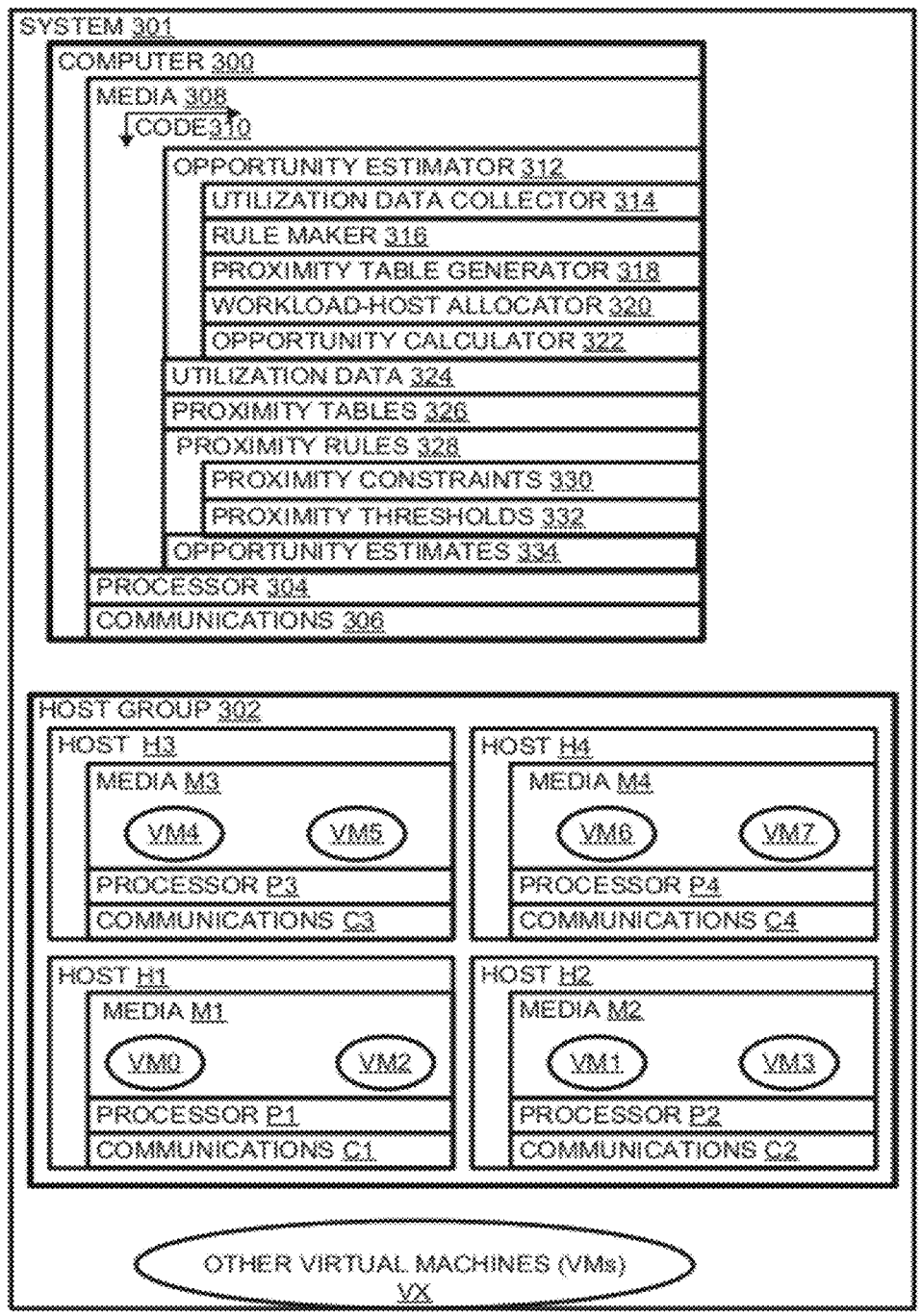
FIG. 3 is a schematic diagram of a system in accordance with another embodiment.

A computer 300, shown as part of a system 301 in FIG. 3, is configured to evaluate an opportunity for a host group, e.g., group 302 of four hosts H1-H4, already hosting "resident" virtual machines VM0-VM7, to host additional virtual machines, e.g., some or all of other virtual machines VX. Hosts H1-H4 each has 16 cores running at 3.12 GHz, representing 50 GHz per host. Host H1 includes a processor P1, communications devices C1, and media M1, and hosts virtual machines VM0 and VM2. Host H2 includes a processor P2, communications devices C2, and media M2, and hosts virtual machines VM1 and VM3. Host H3 includes a processor P3, communications devices C3, and media M3, and hosts virtual machines VM4 and VM5. Host H4 includes a processor P4, communications devices C4, and media M4, and hosts virtual machines VM6 and VM7. In this illustrative example, each of virtual machines VM0-VM7 has been allocated 25 GHz of processing capacity and uses 10 GHz on the average. In alternative embodiments, a group can have a different number of hosts, and the hosts can have a variety of configurations; each host may host zero to any number of virtual machines or other workloads.

Computer 300 includes a processor 304, communications devices 306, and media 308. Media 308 is encoded with code 310 that defines the functionality for an opportunity estimator 312 including a utilization data collector 314, a rule maker 316, a proximity table generator 318, a workload-host allocator 320, and an opportunity calculator 322. In addition, code 310 represents data structures and data including utilization data 324, proximity tables 326, proximity rules 328, including proximity constraints 330 and proximity thresholds 332, and opportunity estimates 334.

Figure 4:
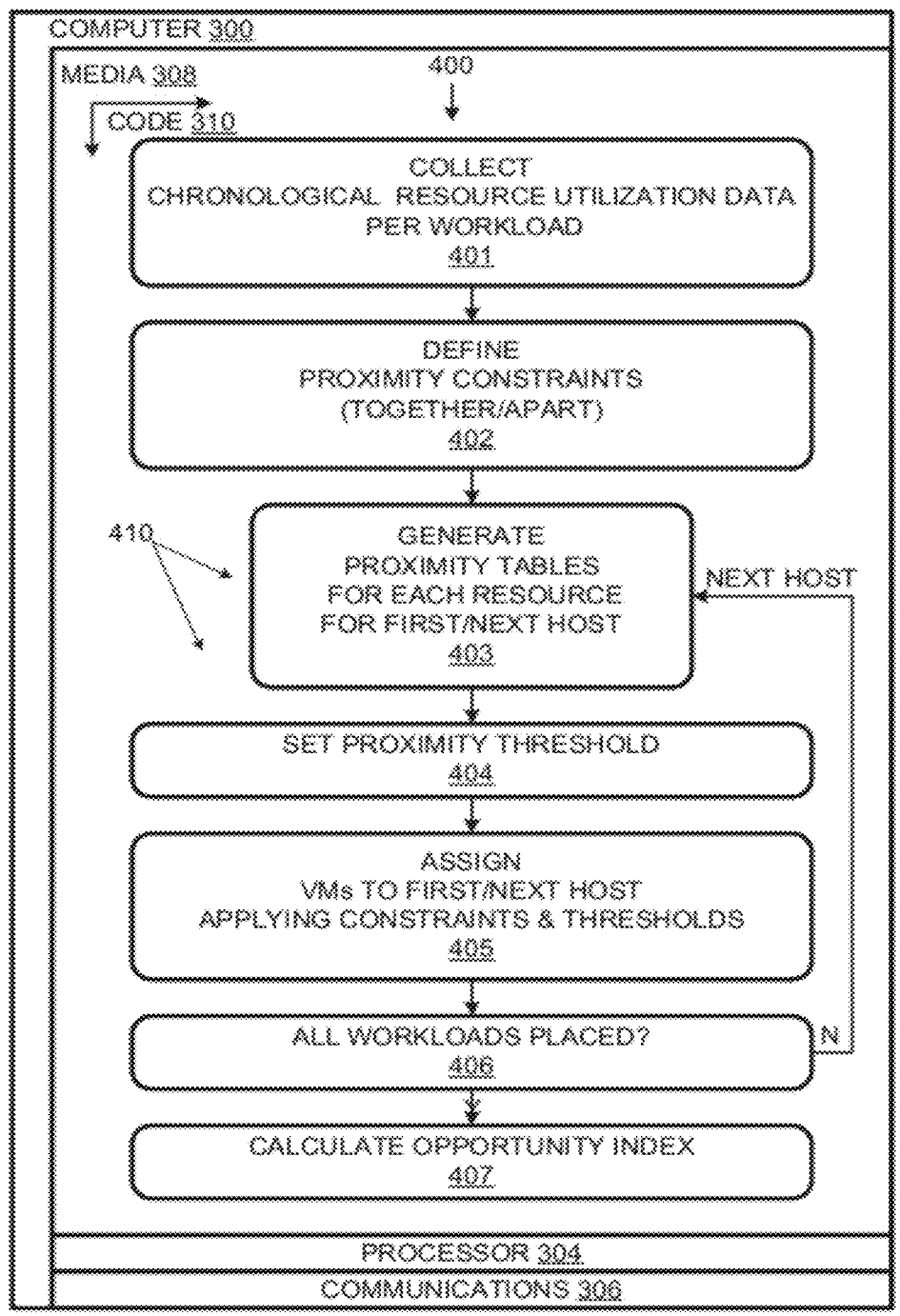
FIG. 4 is a combined schematic diagram and flow chart respectively for the system and a process implemented by the system of FIG. 1

A process 400, implementable by computer 300, is flow charted, in FIG. 4. At process segment 401, utilization data collector 314 of opportunity estimator 312 collects chronological utilization data for each of the currently resident virtual machines, e.g., virtual machines VM0-VM7. This can be done by querying a workload manager for utilization data; in an alternative embodiment, the utilization, data collector is a workload, manager that collects utilization data to determine how to allocate virtual machine workloads to hosts. Chronological utilization is represented in graphs 510 in FIG. 5A, for virtual machines VM0-VM3, (which in this expository example, happen to have the same utilization profiles over time) and 520 FIG. 5B for virtual machines VM4-VM7 (which in this expository example, also happen to have the same utilization profiles over time). In general, each virtual machine has its own utilization profile over time. In another embodiment, a utilization data collector queries an agent on each host for the required utilization, data.

At process segment 402, an administrator interfaces with rule maker 316 to define proximity constraints 330. For example, "together" and "apart" constraints can be specified. For example, one constraint may be that virtual machines VM0 and VM2 are to be placed together on a host. Another constraint might be that virtual machine VM4 is to be apart from (on a different host than) virtual machine VM7. In other embodiments, other constraints, including multi-way constraints (e.g., at most two of virtual machines VM1, VM2, and VM3 can be together) are applied.

Figure 5A:
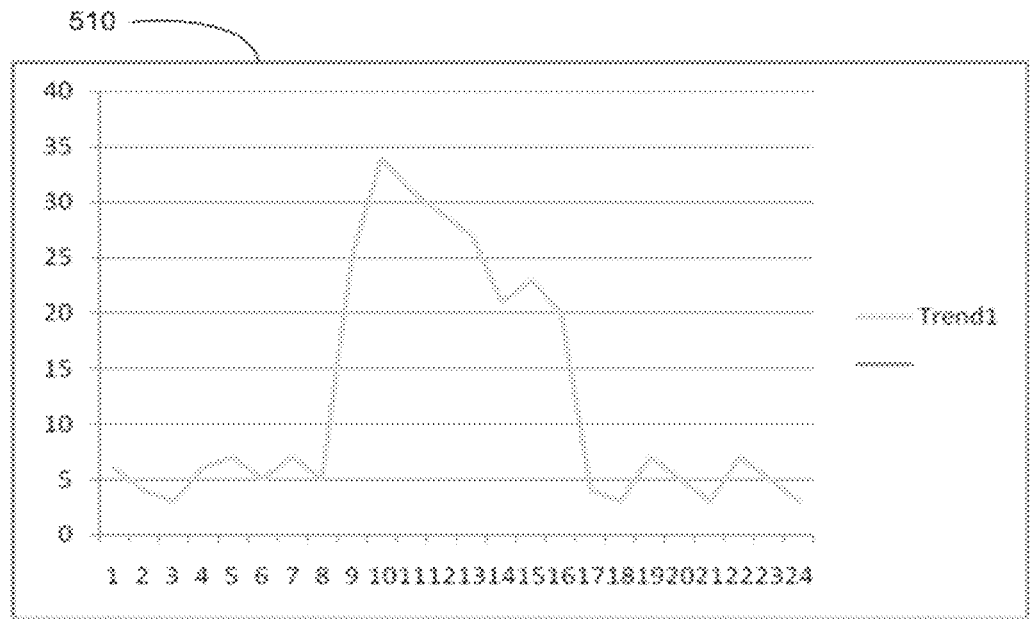
FIGS. 5A and 5B are chronological resource utilization graphs used in the process of FIG. 4.
Figure 5B:
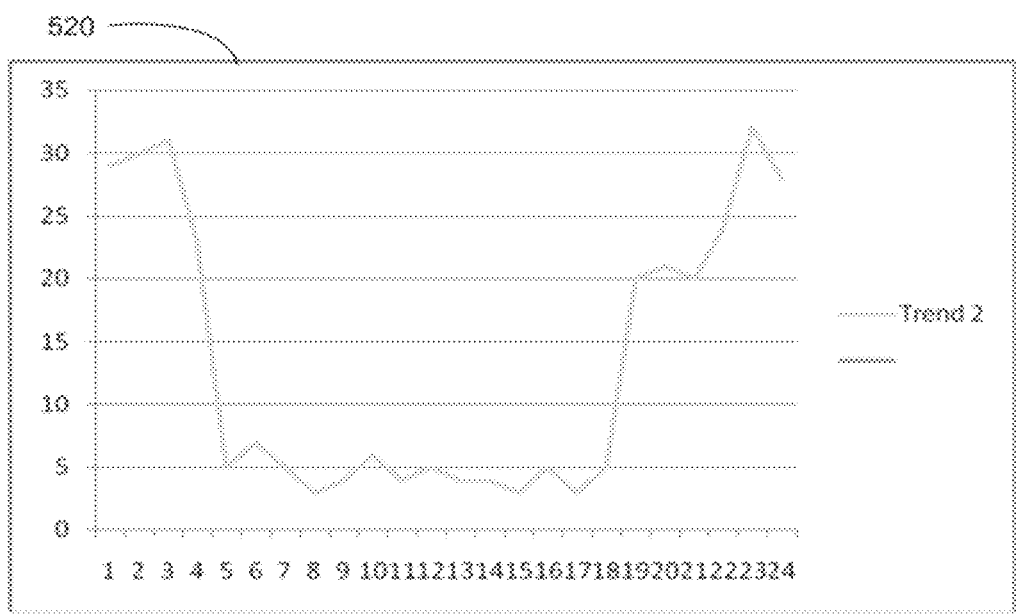

Process segments 403-406 form a loop 410 that can be iterated once per host until all resident virtual machines VM0-VM7 have been allocated to a host. Process segment 403 involves creating proximity tables. For a single iteration, one proximity table per resource (CPU, memory, bandwidth) can be used. Alternatively, a proximity table can represent a combination of resources. A proximity table can be built up data-point-by-data-point as shown by the following example with respect to data point (time) "10" in graphs 510 and 520 (FIGS. 5A and 5B).

At data point time 10, virtual machines VM0-VM3 have CPU (Central Processing Unit) utilizations of 3 GHz each, while virtual machines VM4-VM7 have CPU utilizations of 34 GHz each. Considering the virtual machines in order of increasing utilization, it can be seen that virtual machines VM0-VM4 can be placed on host H1, which has 50 GHz CPU capacity, but that there is insufficient remaining capacity for virtual machines VM5, VM6, or VM7. This can be expressed by assigning a placement index to each virtual machine, so that virtual machines VM0, VM1, VM2, and VM3 are assigned "1s" (=can be placed on host H1), while virtual machines VM4, VM5, and VM6 are assigned "0s", as they are not to be placed on host H1.

These placement indexes can be used to generate single-data-point proximity table 600, shown in FIG. 6. Each entry in table 600 indicates the number of times a virtual machine pair shared a placement index of 1. Similarly, single-data-point proximity tables can be generated for all of 155 data points (24 of which are shown in FIGS. 5A and 5B), and the resulting single-data-point proximity tables can be summed to yield a combined proximity table 700 shown in FIG. 7, to be used in allocating virtual machines to host H1. Note that if more than one resource type is being considered, a proximity table can be generated for each resource type. A weighted combination of the proximity tables can then be generated; alternatively, the tables can be used separately in allocating virtual machines to hosts.

At process segment 404, proximity thresholds 332 are set, typically, once or once per iteration of loop. In practice, an administrator can set thresholds using rule maker 316. A default virtual machine pair placement threshold (e.g., as a percentage of the total number of data points represented in a proximity table) cart be used to determine whether a virtual machine can be selected to join another virtual, machine already allocated to a host (assuming there is no overriding proximity constraint). For example, if a placement threshold of 90% is set, then only mirtual-machine pairs with placement probability of at least 90% are considered for placement as explained more fully by example with respect to process segment 405.

At process segment 405, workload-host allocator 320 assigns virtual machines to the current (first or next) host applying rules 328, including constraints 330 and thresholds 332. For example, consider a case in which virtual machines VM0 and VM2 must be together, virtual machines VM4 and VM7 must be apart, the proximity threshold is set at 90%, and the number of data points represented (e.g., in proximity table 700) is 155.

PROXIMITY (i, i) values are searched in table 700 of FIG. 7. PROXIMITY (0, 0) (row 0, column 0)=155, which is 100% of the number of represented data points. Accordingly, virtual machine VM0 is selected for placement on host H1. In view of the proximity constraint that it must be placed with virtual machine VM0, virtual machine VM2 is placed on host H1. In this case, PROXIMITY (0, 2) is 155 or 100%; however, even if it were below the set threshold, the placement would be made since constraints take precedence over thresholds. PROXIMITY (0, 1) is 155 or 100%, so virtual machine VM1 is placed with virtual machine VM0 on host H1. Likewise, PROXIMITY (0, 3) is 155 or 100%, so virtual machine VM3 is placed with virtual machine VM0 on host H1.

For the remaining VMs, the proximity values with respect to VM0 fall below the 90% threshold, so VM4-VM7 are not placed on host More specifically, PROXIMITY (0, 4)=80 or 51.6% of 155; PROXIMITY (0, 5)=79 or 50.96%; PROXIMITY (0, 6)=79 or 50.96%, and PROXIMITY (0, 7)=30 or 19.35%.

At process segment 406, allocator 320 determines whether or not there are additional virtual machines to be placed. If yes, loop 410 is iterated. If not, process 400 progresses to process segment 407. In the example discussed above, after the first iteration of loop 410, virtual machines VM4-VM7 remain to be placed. Accordingly, process 400 returns to process segment 403.

In each iteration of process segment 403, a proximity table is generated for the un-placed virtual machines. In the example, in the second iteration of process segment 403, a proximity table 800, shown in FIG. 8, is created for virtual machines VM4-VM7 using the method used to generate proximity table 700. Table 800 indicates all proximity values are 155 or 100%. At the second iteration of process segment 404, a new threshold 332 may be set, e.g., 80%. However, regardless of the threshold, in the second iteration of process segment 405, virtual machines VM4-VM7 can be placed on host H2 since their placement values are all 100% (assuming no apart rule to the contrary is in place). At the second iteration of process segment 406, it is determined that all virtual machines have been placed, so process 400 exits loop 410 and proceeds to process segment 407. On the other hand, in case of constraint that requires virtual machines VM4 and VM7 to be apart, virtual machines VM7 is not included with virtual machine VM4 on H2, placement for virtual machine VM4 is kept on hold for next iteration, during which it may be placed on host H3.

At process segment 407, opportunity calculator 322 calculates an opportunity index indicating a potential capacity that can be saved and used to host additional virtual machines VX. Process segment 407 can be divided into process segments 901-903, as shown in FIG. 9.

At process segment 901, opportunity calculator 372 determines a reference resource segment (e.g., virtual machine or other workload) size. This reference size is a statistically calculated size of a virtual machine to be placed on any of the available hosts, e.g., a modal (most-frequently occurring) size for the resident virtual machines, e.g., VM0-VM7. Alternatively, the size of the largest (highest resource consumption) virtual machine among the resident virtual machine may be selected. In the present examples, virtual machines VM0-VM7 use 10 GHz each, so the reference size is 10 GHz. Alternatively a reference size based on expected utilization by virtual machines VX can be used.

At process segment 902, opportunity calculator 322 calculates expected savings in resource capacity. The expected savings in resource capacity can be calculated based on the reference size. In the example, each host H1-H4 has a CPU capacity of 50 GHz. Host H1 was allocated 4×10 GHz of virtual machines, leaving 10 GHz unused. Host H2 was allocated 40 GHz of virtual machines, leaving 10 GHz unused. No virtual machines were allocated to hosts H3 and H4, leaving an additional 100 GHz available. The total capacity available is 120 GHz. Dividing this by the 10 GHz reference size indicates that 12 more virtual machines can be hosted by group 302.

At process segment 903, the savings in resource capacity is translated into an opportunity index, e.g., using table 1000 of FIG. 10. In the example, an index is generated to reflect the relative amount of virtual machines that can be added over the amount already resident. In the example, those amounts are 12 and 8; 12 is 150% of 8. 150% is greater than 100% so, according to table 1000, an opportunity index of 5 is assigned to host group 302. This completes process 400.

Figure 11:
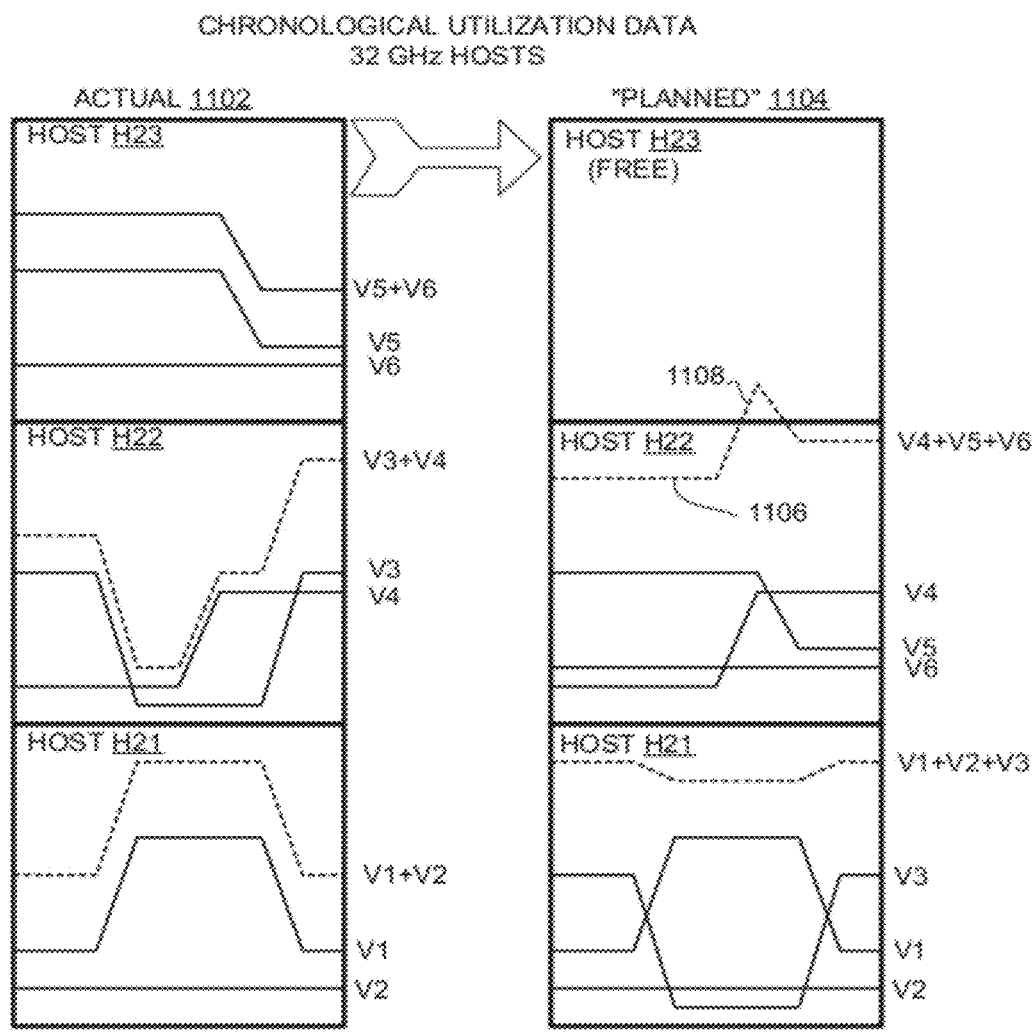
FIG. 11 is a set of chronological utilization data graphs corresponding to CPU utilization by respective virtual machines running on hardware hosts before and during the process of FIG. 4.

As further explained in the following example, process 400 provides opportunity estimates that take into account the fact that workloads with non-aligned utilization peaks can often be packed more efficiently on a host than would be suggested by simply adding up static/absolute utilizations of virtual machines. FIG. 11 includes a set of resource utilization graphs corresponding to six virtual machines V1-V6 arranged on three 32 GHz (16×2 GHz) hosts H21-H23. In an "actual" arrangement 1100, virtual machines V1 and V2 are hosted by host H21, virtual machines V3 and V4 are hosted on host H22, and virtual machines V5 and V6 are hosted on host H23. However, in the course of process 400, a reallocation is planned in which host H21 hosts virtual machines V1-V3 and host 1122 hosts virtual machines V4-V6, freeing up host H23 for additional virtual machines.

The graphs in FIG. 11 correspond to the chronological utilization data in the table 1200 of FIG. 12, which covers nine data points D0-D8. In practice, many more data points would be used than are used here for expository purposes. This chronological utilization data is collected in process segment 401 (FIG. 4). In this example, no proximity constraints are defined at process segment 402.

In the first iteration of loop 410, a proximity table 1300 of FIG. 13 is generated for first host 1121 using utilization data from table 1200 as follows. By default, virtual machine V1 is placed on host H21. For each data point D0-D9 in utilization table 1200, a determination is made regarding how many of virtual machines V2-V6 can be placed with virtual machine V1 on host H21 when they are considered in the (basically arbitrary) order of utilization table 1200.

For example, at data point D0, the sum (V1+V2+V3+V4) of the utilizations for virtual machines V1-V4 is 32 GHz, which equals the capacity of host H21. Therefore, all four can be placed on host H21, but there is no room remaining on host H21 for virtual machine V5 or virtual machine V6. This situation is presented by the bolding of the 8, 4, 16, and 4 in row D0, in which the rightmost 16 and 6 remain unbolded. As indicated by the bolding in utilization table 1200, for data points D0-D4, virtual machines V1-V4 (and not virtual machine V5 or virtual machine V6) can be placed on host H21. For data points D5-D8, virtual machines V1-V3 (and not virtual machine V4, V5, or V6) can be placed on host H21.

The V1 row of proximity table 1300 is then populated by the counts for each column of utilization table 1200. For example, all nine entries for virtual machine V1 are bold in utilization table 1200, indicating that virtual machine V1 can be placed on host H21 for all data points D0-D9. Therefore, a 9 is entered at cell V1/V1 of table 1300. Likewise, 9s are entered into cells V1/V2 and V1/V3. A 5 is entered at V1/V4, as indicated by the five bolded values in the V4 column of utilization table 1200. Zeroes are inserted for V1/V5 and V1/V6. The rows for V2-V6 are populated as indicated in proximity table 1300, to indicate for each virtual machine V1-V6, the number of data points at which the virtual machine is to be placed with virtual machine V1 on host H21.

At process segment 404, a proximity threshold of 85% is set. At process segment 405, virtual machines are assigned to host H21 based on the values in proximity table 1300. Note that, in said proximity table, the number of data points is nine, so a proximity value of 9 corresponds to 100%, a proximity value of 8 corresponds to 89%, and a proximity value of 7 corresponds to 78%. Thus, only virtual machines with a proximity value of 8 or 9 will be placed at process segment 405 when the threshold is 85%. Accordingly, virtual machines V1-V3 are placed on host H21.

In the first iteration of process segment 406, it is determined that not all workloads have been placed; in particular virtual machines V4-V6 have not been placed. Accordingly, process 400 returns to process segment 403 for the next iteration of loop 410 for placing virtual machines on host H22. For expository purposes, the relevant utilization data from table 1200 has been extracted and re-presented in table 1400 of FIG. 14. For data points D0-D4 and D6-D8, all three virtual machines V4-V6 can be placed on host H22. However, for data point D5, virtual machines V4 and V5 can be placed, but virtual machine V6 does not fit along with them. The shortfall at data point D5 is indicated by the 8s (instead of 9s) in the row and column associated with virtual machine V6 in host H22 proximity table 1500 of FIG. 15. However, since 8 corresponds to 89%, which is greater than the proximity threshold of 85%, all three virtual machine V4-V6 are placed on host H22, as indicated in FIG. 11.

At the end of the second iteration of process segment 406, there are no more virtual machines to place. Accordingly, process 400 proceeds to process segment 407. Since host H23 remains free of the original virtual machines V1-V6, an additional 50% can be hosted. The corresponding opportunity index is then 3 according to table 1000 of FIG. 10.

This savings is made possible by the use of proximity tables, which by design, take into account the alignment or non-alignment of utilization peaks. For example, as indicated in FIG. 11, the peaks for virtual machines V1 and V3 occur during mutually exclusive sets of data points. Also, albeit to a lesser extent, the utilization curves for virtual machines V3 and V5 are complementary. Thus, process 400 can achieve estimates representing better packing of virtual machines on hosts than can methods based solely on peak or average utilization.

Note that in FIG. 11, the planned plot 1104 for the sum (V4+V5+V6) of the expected utilizations of virtual machines V4-V6 has a positive excursion 1108 beyond the capacity of host H22. In actual operation, such a point would correspond to an excess of demand over supply of CPU cycles and, thus, a performance drop. During process segment 400, this excursion corresponds to a risk that the planned replacement will encounter such performance drops. Excursion 1108 corresponds to data point 5, at which virtual machine V6 was not placed on host H21.

To reduce the risk of such a performance drop, a higher threshold can be set. For example, setting the proximity threshold to 90% or above would have prevented virtual machine V6 from being placed on host H21. Another iteration of loop 410 would have been required, resulting in virtual machine V6 being placed on host H23. In that case, there would be no excursion above host capacity and the likelihood of a performance bottle neck would be significantly decreased.

In the foregoing examples, only one resource, in this case, CPU processing, was considered. However, more than one resource can be considered. In such a case, computer 300 provides separate proximity tables for each resource. A placement index can be constructed for each metric for each data point, and the results can be used to populate separate proximity tables. VMs are selected for placement when they satisfy individual or pairing values in all pertinent proximity tables.

In an alternative embodiment, respective data points are analyzed to derive a single common placement index. In this case, a single proximity table can represent multiple resources. In an example, each resource can be given a priority, with only the higher priority resource being considered. Alternatively, a magnitude of a multi-resource vector can be used to generate placement indices.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation. "Storage medium" and "storage media" refer a system including non-transitory tangible material in or on which information is or can be encoded so as to be readable by a computer. "Display medium" and "display media" refer to storage media in which information is encoded in human readable form. "Computer-readable" refers to storage media in which information is encoded in computer-readable form.

Herein, unless preceded by the word "virtual", "machine", "device", and "computer" refer to hardware or a combination of hardware and software. A "virtual" machine, device or computer is a software analog or representation of a machine, device, or server, respectively, and not a "real" machine, device, or computer. A "server" is a real (hardware or combination of hardware and, software) or virtual computer that provides services to computers. Herein, unless otherwise apparent from context, a functionally defined component (e.g., generator, allocator, estimator, calculator, collector) of a computer is a combination of hardware and software executing on that hardware to provide the defined functionality. However, in the context of code encoded on computer-readable storage media, a functionally-defined component can refer to media encoded with software.

Herein, a computer is a machine having co-located or distributed components including computer-readable storage media, a processor, and one or more communications devices. The media stores or is configured to store code representing data including computer-executable instructions. The processor, which can include one or more central-processing units (CPUs), reads and manipulates data in accordance with the instructions. "Communication(s) device(s)" refers to computer-hosted devices used to transmit and/or receive data. Herein, a "computer network" is a network of communicatively coupled real and, in some cases, virtual nodes, wherein the nodes can be, by way of example and not of limitation, servers, network infrastructure devices, and peripherals. Herein, a "node" encompasses real and virtual devices.

Herein, "proximity" refers to a relationship between virtual machines or other workloads that indicates whether they are or should be placed together on a host. A "proximity table", herein, is a table with rows and columns associated with respective workloads and in which the cells are populated with proximity values for the workload pair for the corresponding row and column. Herein, a "proximity rule" is a rule for determining whether or not a second workload should be placed on the same host as a first workload based on proximity values. A "proximity constraint" is a rule requiring or precluding one workload being placed on the same host as another. A "proximity threshold" is a rule that requires or precludes one workload being placed on the same host as another depending on whether their proximity value exceeds some threshold value. Herein, a workload is "assigned" to a host for planning purposes, even though there is no intent to actually place that workload on that host.

Herein, a "placement opportunity" is a measure or index indicating a quantity or range of quantities of workloads that can be added to hardware hosts without unacceptably adversely affecting performance. A placement opportunity may be expressed in terms of a relative or absolute number of additional workloads (e.g., of a reference size) that may be added to workloads already resident on the hosts.

In this specification, related art is discussed for expository purposes. Related art labeled "prior art", if any, is admitted prior art. Related art not labeled "prior art" is not admitted prior art. In the claims, "said" qualifies elements for which there is explicit antecedent basis in the claims; "the" refers to elements for which there is implicit antecedent basis in the claims; for example, the phrase "the center of said circle" indicates that the claims provide explicit antecedent basis for "circle", which also provides as implicit antecedent basis for "center" since every circle contains exactly one center. The illustrated and other described embodiments, as well as modifications thereto and variations thereupon are within the scope of the following claims.

What is claimed is:

1. A process performed by a computer comprising:
   generating a combined-proximity table for a resource of a first or next host of a group of hardware hosts configured to execute pairs of virtual machines in each of the hardware hosts, the combined proximity table indicating, for each pair of said virtual machines, a number of data points representing times at which the pair of virtual machines was executing on the respective host;
   assigning pairs of virtual machines to said first or next host based on the first host's core capacity by applying proximity rules to the respective combined proximity table to establish assignments of pairs of virtual machines to hosts, wherein the proximity rules include at least one of proximity constraints and proximity thresholds;
   determining if all virtual machines that are to be assigned have been assigned, and if not all virtual machines that are to be assigned have been assigned, repeating said generating and assigning for a selected next host, and
   calculating an index for assigning additional virtual machines to said group of hardware hosts based on said assignments, wherein calculating includes setting a reference virtual machine size, and the index reflects a relative amount of virtual machines, based on the reference virtual machine size, that can be added over an amount of virtual machines already assigned.

2. A process as recited in claim 1 wherein said generating involves using chronological resource utilization data associated with said virtual machines.

3. A system comprising a processor and a storage medium storing code executable by the processor, wherein the code includes:
- a proximity table generator that, when executed, is configured to generate a combined-proximity table for a resource of a first or next host of a group of hardware hosts configured to execute pairs of virtual machines in each of the hardware hosts, the combined proximity table indicating, for each pair of said virtual machines, a number of data points representing times at which the pair of virtual machines were both executing on the respective host;
- a workload-host allocator that when executed, is configured to assign pairs of virtual machines to said first or next host, based on the first host's core capacity, by applying proximity rules to the respective combined proximity table to establish assignments of pairs of virtual machines to hosts, wherein the proximity rules include at least one of proximity constraints and proximity thresholds and determine whether all virtual machines that are to be assigned have been assigned; and
- an opportunity calculator that, when executed, is configured to, once all virtual machines that are to be assigned have been determined to have been assigned, calculate an index for assigning additional virtual machines to said group of hardware hosts based on said assignments by the workload-host allocator, wherein calculating includes setting a reference virtual machine size, and the index reflects a relative amount of virtual machines, based on the reference virtual machine size, that can be added over an amount of virtual machines already assigned.

4. A system as recited in claim 3 wherein the code includes a utilization data collector that, when executed, is configured to collect utilization data to be used by said proximity table generator in generating said combined-proximity table.

5. A non-transitory computer-readable storage media encoded with code configured to, when executed by a processor:
- generate a combined proximity table for a resource of a first or next host of a group of hardware hosts configured to execute pairs of virtual machines in each of the hardware hosts, the combined proximity table indicating, for each pair of said workloads, a number of data points representing times at which the pair of virtual machines was executing on the respective host;
- assign pairs of virtual machines to said first or next host based on the first host's core capacity by applying proximity rules to the respective combined proximity table to establish assignments of pairs of virtual machines to hosts, wherein the proximity rules include at least one of proximity constraints and proximity thresholds;
- determine whether all virtual machines that are to be assigned have been assigned, and if not all virtual machines that are to be assigned have been assigned, repeating said generating and assigning for a selected next host; and
- calculate an index for assigning additional virtual machines to said group of hardware hosts based on said assignments, wherein calculating includes setting a reference virtual machine size, and the index reflects a relative amount of virtual machines, based on the reference virtual machine size, that can be added over an amount of virtual machines already assigned.

6. A system as recited in claim 5 wherein said code is further configured to collect chronological resource utilization data to be used in generating said combined proximity table.

7. A system as recited in claim 6 wherein said code represents said chronological utilization data, said proximity rules, and said placement opportunity.

* * * * *